July 6, 1937. A. W. KEUFFEL 2,086,502
RUNNER FOR SLIDE RULES
Filed Nov. 11, 1933
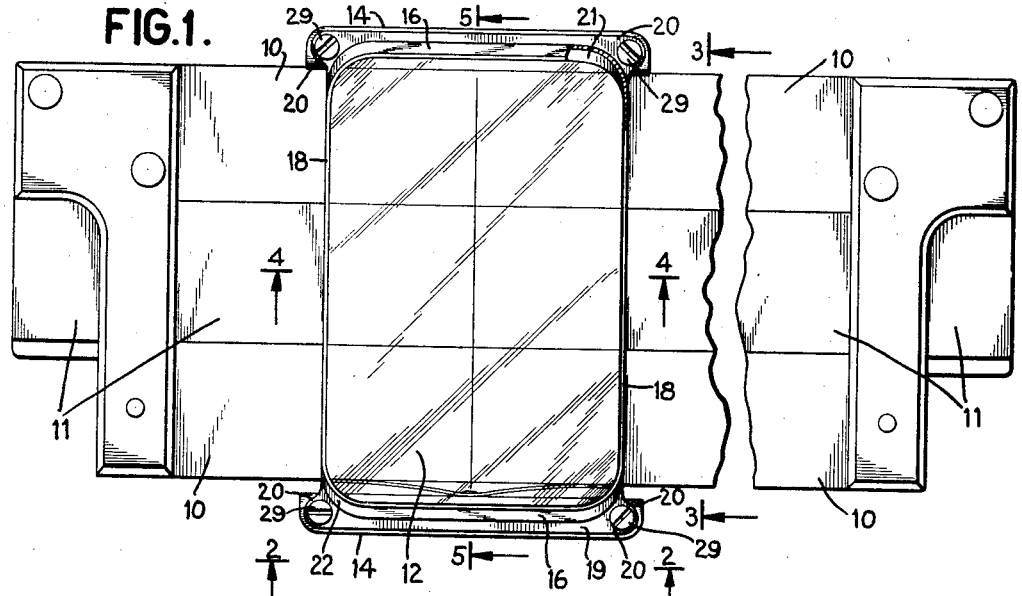
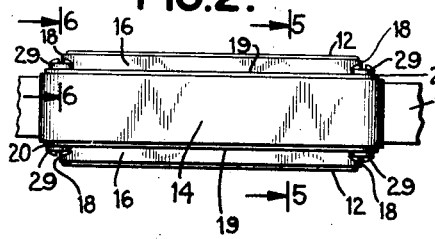
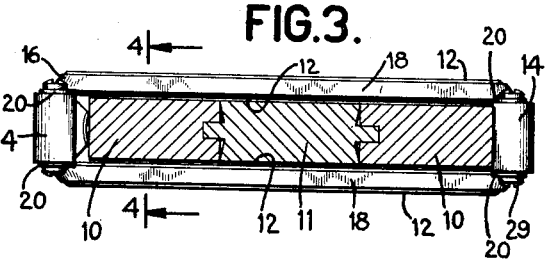
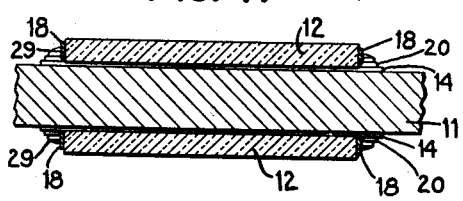
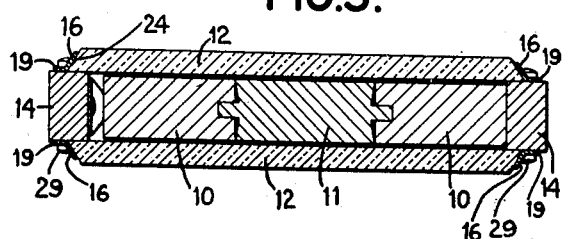
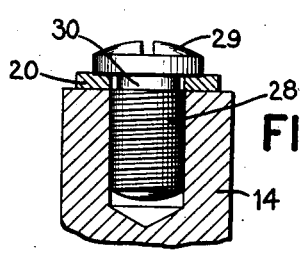
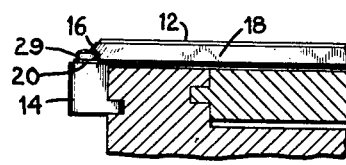
INVENTOR
ADOLF W. KEUFFEL
Frederick Griswold Jr.
ATTORNEY Patented July 6, 1937

2,086,502

UNITED STATES PATENT OFFICE 2,086,502

RUNNER FOR SLIDE RULES

Adolf W. Keuffel, Montclair, N. J., assignor to Keuffel & Esser Company, Hoboken, N. J., a corporation of New Jersey Application November 11, 1933, Serial No. 697,642

13 Claims. (Cl. 235—70)

This invention relates to slide rules and more particularly to runners therefor.

The primary object of the invention is the protection of the glass or other transparent panel bearing a hair-line against damage should the slide rule be dropped or otherwise struck.

The first slide rules were provided with runners comprising a frame in which there was set the glass or other transparent panel inscribed with the hair-line. Such frame enclosed the edges of the glass to support it in its proper position and had the disadvantage that it obstructed the view of numbering on the scale, often necessary to the reading whereby inconvenience and error was occasioned. In order that the view of the graduations of the scale should not be obstructed by the elements of the frame, it was then proposed that a transverse, transparent panel extend across the space between the end bars and constitute the sole connection holding them in position. Such a panel, however, was unprotected and sometimes became broken or chipped. Moreover, it was often broken in drilling the holes for the screws.

The present invention has for an object a frame which shall engage the edges of the transparent panel bearing the hair-line to protect the panel against damage and, at the same time, constitute a connection between the end bars to hold them in position and relieve the panel of strain, said frame, however, affording substantially no obstruction to the view of the graduations on the scale. To this end, a frame is provided whereof those portions extending transversely across the face of the slide rule are relatively thin and do not overlap the faces of the panel.

The invention also seeks means of securing the transparent panel in the frame. To this end, the ends of the panel are bevelled and the edges of the frame adapted to cooperate therewith are inclined inwardly to engage the panel and clamp the same against the guide devices.

A further object of the invention is a frame which shall permit adjustment of the hair-line with respect to the guide devices. To this end, the holes in the frame through which the screws securing the frame to the guide devices are oversized and the screws of reduced diameter approximate the head so as to permit relative motion between the frame and the screws.

Yet another object of the invention is to assure at all times that the hair-line of the panel shall be parallel to the indication of the scale. To this end, the sides of the frame are parallel with respect to each other and to the sides of the panel so that any displacement which may occur can only occur in a direction transverse of the rule and no angular shifting of the hair-line is possible.

Still another object of the invention is to prevent contact of the frame with the base of the rule which might scratch or mar the celluloid casing and obliterate the scale. Accordingly, the ends of the frame through which the securing screws pass into the end bars are offset downwardly so that the frame is, in effect, spaced from the upper surface of the end bars.

The invention also seeks a construction which has compactness, strength and rigidity. To this end, the corners of the glass are rounded as well as the frame, thereby not only affording strength and rigidity but also a space for the securing screws so that shorter end bars may be used.

These and other objects of the invention and the means for their attainment will be more apparent from the following detailed description taken in connection with the accompanying drawing illustrating one embodiment by which the invention may be realized, and in which:

Figure 1 is a view showing, in plan, the runner of this invention applied to a slide rule of the kind having scales upon both faces, a part of the frame being broken away to show the shape of the transparent panel;

Figure 2 is a view showing the runner in end elevation;

Figure 3 is a view showing the runner in side elevation, taken in the plane indicated by the line 3—3 of Figure 1 and looking in the direction of the arrows;

Figure 4 is a transverse sectional view taken in the plane indicated by the line 4—4 of Figures 1 and 3 and showing the slide rule in longitudinal section;

Figure 5 is a longitudinal sectional view of the runner taken in the plane indicated by the line 5—5 of Figures 1 and 2, looking in the direction of the arrows, the slide rule being in transverse section;

Figure 6 is a fragmentary sectional view showing the manner in which the frame is secured to an end bar; and Figure 7 is a fragmentary sectional view showing the application of the invention to the Mannheim type rule.

While the invention has been illustrated as applied to a slide rule of the kind having scales upon both faces, it will be obvious that the invention is equally applicable to a slide rule of the Mannheim type, see Figure 7.

Referring first to Figure 1, the rule 10 and slide 11 are shown without scales as these form no part of the present invention. The runner is illustrated as having the transparent plate 12 affixed to the end bars 14 adapted to slidably engage and reciprocate along the side edges of the rule, as will be understood. Extending between the two spaced guide devices, is a frame composed of the end members 16 and the side members 18 which frame is conveniently formed from a single sheet of metal, the sides 16 having integral therewith end plate portions 19 extending outwardly beyond the ends 16 of the frame and to the side to form ears or lugs 20. The frame is so formed that the side members 18 are relatively thin and have their greater dimension in a plane perpendicular to the plane of the base portion 19. The ends 16 converge upwardly and inwardly, as shown specifically in Figure 5 and the corners are rounded, as at 22, where they merge from the bevelled portion 16 to the vertical sides 18, thus forming, in effect, a web which adds considerable strength to the construction at this point.

The ends of the transparent panels 12 within the frame are bevelled, as at 21, Figure 1, and rounded and bevelled to substantially conform to the curvature of the corners 22 of the frame, as shown at 24 in Figure 5. The liberal rounding of the edges of the panel not only affords sufficient room for the heads of the screws without making the end bars unduly long or wide but also permits a reenforcement to be given the frame in the form of a substantial web 22. Moreover, the rounding of the edges of the glass greatly reduces the danger of breakage as would be the case had the glass square corners.

It is comparatively easy to make the two long edges of the glass straight, parallel and an exact distance from one another. Therefore, a positive fit is assured in the fitting of the glass against the long edges of the frame. It is more difficult to make the glasses with exact angles and with an exact distance from the base of one bevelled angle to the base of the other bevelled angle. However, a considerable amount of play is permissible in the longer axis. Even though the glass can be slightly shifted back and forth transversely of the rule, it will in no way affect the accuracy of the readings by the hair-line because the hair-line of the glass runs in a transverse direction to the rule and, therefore, is controlled by the exact fit of the two parallel long edges.

The base portions 19 are offset downwardly from the plane of the frame 16, 18 so that the base portion 19 alone rests on the surface of the end bars 14 and the frame is spaced from the surface of the rule and cannot scratch the scales. Moreover, the heads 29 of the screws 28 are thus disposed below the upper surface of the panel, thereby affording a more compact runner construction and permitting the use of a smaller case to contain the slide rule. This permits, in assembly, the panel 12 to rest upon the surface of the end bars 14 and the frame is placed thereabove and secured in position by the screws. Thus the frame and particularly the ends 16 and corners 22 thereof serve to clamp the ends of the panel to the respective end bars.

Each ear 20 is perforated with a hole, Figure 6, to permit a screw 28 to pass therethrough. Conveniently, these screws 28 are provided with a portion 30 of reduced diameter immediately beneath the head 29 to permit adjustment. If the screws 28 are loosened slightly in the end bars 14 so that the heads 29 no longer press upon the ears 20, the frame may be shifted laterally and angularly to adjust the position of the hairline.

By this construction, the transparent panel is clamped at the ends to the end bars and only relatively thin metallic frame members 18 are disposed adjacent the edge of the glass. These frame members may be so proportioned as to afford less obstruction to the view of the scale than was afforded by the frosted edges formed in the prior art by bevelling the edges of the transparent panel that constituted the sole connection between the end bars. Since the sides of the panel are parallel to one another and to the hairline and since the sides 18 are similarly parallel even though the panel should become slightly loose in the frame, the panel can only move in the longitudinal direction of the hair-line and it cannot become displaced out of parallel relationship with the subdivisions of the scale. Thus the reading is always exact. The frame of this invention permits a narrower end bar to be used. In the Mannheim type rule, as shown in Figure 7, the frame extending between the end bars and the web reenforcement at the rounded corners 22 adds strength to the construction and relieves the glass of strain.

Various modifications will occur to those skilled in the art in the composition, configuration and disposition of the component elements going to make up the invention as a whole and no limitation is intended by the phraseology of the foregoing specification or illustrations in the accompanying drawing.

What is claimed is: —

1. A slide rule runner comprising the combination with spaced end bars for slidably engaging opposite edges of a rule, of a transparent panel having parallel sides and bevelled ends and rounded corners, a metallic frame extending between the end bars having thin sides engaging only the side edges of the panel and upwardly and inwardly directed end members adapted to overlie the ends of the transparent panel and rounded corners, said frame being formed with an apertured downwardly offset ear outwardly of each rounded corner and screws formed with a portion of reduced diameter immediately beneath the head and respectively passing through the apertures into the end bars said portions of reduced diameter being aligned with the offset ears whereby loosening the screws while still engaged in the end bars will permit a shifting of the frame relative to the end bars after which the screws may be tightened to secure the frame in its adjusted position.

2. A slide rule runner comprising spaced end bars, a transparent panel extending therebetween, a frame within which said panel is disposed, whereof the side frame members are thin strips and engage only the side edges of the panel, said end frame members having portions extending upwardly and inwardly to overlie the respective ends of the panel and means to secure the frame to the end bars.

3. A slide rule runner comprising spaced end bars, a transparent panel extending therebetween whereof the ends are bevelled, a frame within which said panel is disposed, whereof the side frame members are thin strips and engage only the side edges of the panel, said end frame members having portions extending upwardly and inwardly to overlie the respective bevelled ends of the panel and means to secure the frame to the end bars.

4. A slide rule runner comprising spaced end bars, a transparent panel extending therebetween having rounded corners, a frame within which said panel is disposed, whereof the side frame members are thin strips and engage only the side edges of the panel, said end frame members having portions extending upwardly and inwardly to overlie the respective ends of the panel, the corners of the frame being rounded and means outwardly of the rounded corners to secure the frame to the end bars.

5. A slide rule runner comprising spaced end bars, a transparent panel extending therebetween whereof the ends of the panel rest on the side bars, respectively, a frame within which said panel is disposed, the side frame members being thin strips engaging only the side edges of the panel, said end frame members having portions extending upwardly and inwardly to overlie the respective ends of the panel and means to secure the frame to the end bars to clamp the panel to the end bars.

6. A slide rule runner comprising spaced end bars, a transparent panel extending therebetween whereof the ends of the panel are bevelled and rest on the side bars, respectively, a frame within which said panel is disposed, the side frame members being thin strips engaging only the side edges of the panel, said end frame members having angularly disposed portions extending upwardly and inwardly to overlie the respective bevelled ends of the panel and means to secure the frame to the end bars to clamp the panel to the end bars.

7. A slide rule runner comprising spaced end bars, a transparent panel extending therebetween formed with bevelled ends, a frame within which said panel is disposed whereof the side frame members are thin strips and engage only the side edges of the panel, the end frame members having portions to engage the end bars respectively, and angularly disposed portions extending upwardly and inwardly to overlie the respective bevelled ends of the panel, the dimension of the longer face of the panel being less than the distance between the end bar engaging portions of the frame and means to secure the frame to the end bars.

8. A slide rule runner comprising the combination with spaced end bars for slidably engaging opposite edges of a rule, of a flat transparent panel of substantially rectangular form having a pair of opposite thin side edges parallel and perpendicular to the plane of the panel and having its other pair of opposite edges bevelled and having rounded corners, a metallic frame of substantially rectangular form having a pair of its opposite edges overlapping the end bars and having a sight opening in which the panel is contained, said sight opening outlined at the ends overlapping the end bars with a pair of inwardly and upwardly angularly directed end members overlying the bevelled ends and the rounded corners of the panel, the portion of said opposite edges overlapping the end bars projecting beyond the other two edges to form ears, and screws passing through the ears and into the end bars exteriorly of the panel.

9. A slide rule runner comprising a substantially rectangular metal frame of greater length than width outlined by a continuous, integral, narrow strip having its opposite shorter sides inclined inwardly and upwardly at an angle to form opposing bevel seats and having its opposite longer sides extending substantially perpendicular to the general plane of the frame, a flat transparent panel contained in the opening of the frame and inserted into the same through its wider underside, said panel having opposite end edges bevelled and fitting between the bevel seats and end bars engaging the underside of the frame opposite its bevel edges to secure the panel in place.

10. A runner for a slide rule comprising a rectangular frame for the reception of a rectangular transparent panel bevelled at its ends, one end of the frame forming a strip angle-shaped in cross section to engage the bevelled ends of the panel and including a flat attaching flange and an upstanding bevel flange, said bevel flange having a substantially straight central portion and rounding at opposite ends of the straight portion, said rounded ends forming webs tending to reinforce the said end of the frame, the flat attaching flange projecting slightly beyond the rounded web forming ends of the bevel flange and apertured to form screw receiving ears for securing the frame in place.

11. A slide rule runner including a pair of spaced apart end bars having their upper surfaces disposed in the same plane, a quadrilateral frame provided with a sight opening, a transparent panel substantially fitting in said frame, the corners of the frame forming four ears disposed in a plane offset downwardly from the balance of the frame and acting to position the portion of the frame containing the panel slightly above the plane of the upper surfaces of the end bars, and screws passed through said ears for securing the same to the end bars.

12. A slide rule runner comprising spaced end bars, a transparent panel extending therebetween, a frame within which said panel is disposed and whereof the side frame members are thin strips and engage only the side edges of the panel, and the end frame members secured with the end bars have means to prevent displacement of the panel with respect to the frame.

13. A slide rule runner comprising spaced end bars, a transparent panel extending therebetween, a frame within which said panel is disposed whereof the side frame members are thin strips and engage only the side edges of the panel, said end frame members having portions extending inwardly to overlie the respective ends of the panel and means to secure the frame to the end bars.

ADOLF W. KEUFFEL.